United States Patent

Ami et al.

Patent Number: 5,828,898
Date of Patent: Oct. 27, 1998

[54] MICROCOMPUTER FOR OUTPUTTING DATA TO THE OUTSIDE OF THE MICROCOMPUTER IN REAL TIME IN RESPONSE TO A RTP OUTPUT REQUEST SIGNAL RECEIVED FROM OUTSIDE THE MICROCOMPUTER

[75] Inventors: Yasuhiro Ami; Takeshi Fujii, both of Hyogo-ken, Japan

[73] Assignee: Mitsubishi Denki Kabushiki Kaisha, Tokyo, Japan

[21] Appl. No.: 470,650

[22] Filed: Jun. 6, 1995

Related U.S. Application Data

[63] Continuation of Ser. No. 926,615, Aug. 6, 1992, abandoned.

[30] Foreign Application Priority Data

Aug. 6, 1991 [JP] Japan ................................. 3-221102

[51] Int. Cl.$^6$ ..................................................... G06F 13/00
[52] U.S. Cl. ......................... 395/825; 395/840; 395/849; 395/893; 395/821
[58] Field of Search ........................ 84/607; 365/185.21, 365/230.01, 736, 870; 368/119; 371/22.1; 395/183.03, 427, 500, 726, 821, 825, 840, 849, 893

[56] References Cited

U.S. PATENT DOCUMENTS

| | | | |
|---|---|---|---|
| 3,825,901 | 7/1974 | Golnek, Sr. et al. | 395/183.01 |
| 4,392,208 | 7/1983 | Burrows et al. | 395/183.07 |
| 4,451,897 | 5/1984 | Murao | 395/427 |
| 4,635,520 | 1/1987 | Mitsumi | 84/607 |
| 4,792,890 | 12/1988 | Blair et al. | 395/736 |
| 4,908,795 | 3/1990 | Tsuchiya et al. | 365/185.21 |
| 4,992,937 | 2/1991 | Hemmi | 395/375 |
| 4,995,038 | 2/1991 | Brown | 395/183.06 |
| 5,005,173 | 4/1991 | Martin | 371/22.6 |
| 5,088,027 | 2/1992 | Tanksalvala et al. | 395/183.03 |
| 5,105,389 | 4/1992 | Matsuo et al. | 365/230.1 |
| 5,202,624 | 4/1993 | Gheewala et al. | 324/158 R |
| 5,228,000 | 7/1993 | Yamagata | 365/201 |
| 5,287,523 | 2/1994 | Allison et al. | 395/870 |
| 5,479,649 | 12/1995 | Runaldue et al. | 371/22.1 |
| 5,488,728 | 1/1996 | Dreyer | 395/726 |
| 5,493,723 | 2/1996 | Beck et al. | 395/500 |
| 5,511,047 | 4/1996 | Kashine | 368/119 |
| 5,581,564 | 12/1996 | Miller et al. | 371/22.1 |

OTHER PUBLICATIONS

LeRoy Finkel & Jerald R Brown, Apple Basic; Data File Programming, ©Jan. 25, 1982, p. 43.

Microcomputer Databook, National Semiconductor Corp., Santa Clara, CA, 1988, pp. 21 to 2–21.

*Primary Examiner*—Thomas C. Lee
*Assistant Examiner*—Po C. Huang
*Attorney, Agent, or Firm*—Townsend and Townsend and Crew, LLP

[57] ABSTRACT

A microcomputer includes an input terminal, coupled to the control terminal of a transmission gate, that receives a real-time request signal asserted by a peripheral. The transmission gate transfers data from a register to the peripheral in synchronism with the assertion of the real-time request signal so that data is provided to the peripheral in real time.

6 Claims, 4 Drawing Sheets

MICROCOMPUTER FOR OUTPUTTING DATA TO THE OUTSIDE OF THE MICROCOMPUTER IN REAL TIME IN RESPONSE TO A RTP OUTPUT REQUEST SIGNAL RECEIVED FROM OUTSIDE THE MICROCOMPUTER

This is a Continuation of application Ser. No. 07/926,615, filed Aug. 6, 1992, now abandoned.

BACKGROUND OF THE INVENTION

1. Field of the Invention

The present invention relates to a microcomputer, particularly to a data output request signal to a real-time peripheral (RTP) which is one of the peripheral circuits of the microcomputer.

2. Description of the Prior Art

The RTP function of a microcomputer outputs data written in a RTP dedicated register to an external terminal in accordance with an RTP output request signal (hereafter referred to as "RTPOUT"0 generated by an RTP output request signal generating circuit at any timing. FIG. 4 is a block diagram of the existing RTP function used for a microcomputer. Numeral 1 is an RTP data output register for temporarily storing the data to be outputted to the outside in accordance with RTPOUT. Numeral 2 is an external output terminal for outputting data. Numeral 4 is a transmission gate for controlling the output of data and 5 is an RTP output request signal generating circuit comprising, for example, a down-counter. Alphanumeric characters 1a and 2a are a signal line extending from the RTP data output register 1 to the external terminal 2. Alphanumeric character 5a is a signal line for RTPOUT. Numeral 6 is a waveform shaping circuit, 7 is a CPU, 7a is a data bus, and 8 is a ROM.

In FIG. 4, the existing RTP function outputs data synchronously with an RTP output request of a microcomputer.

Operations are described below by referring to FIGS. 4 and 5. Data to be outputted at any timing is stored in the RTP data output register 1 through the data bus 7a under the control of the CPU 7 operated by instructions written in the ROM 8. The data stored in the RTP data output register 1 is outputted to the external output terminal 2 because RTPOUT shown in FIG. 5(a) generated by the RTP output request signal generating circuit 5 is sent to the waveform shaping circuit 6 through the signal line 5a, the trailing edge of the shaped signal is detected, the shaped signal is inputted to the transmission gate 4 as the signal shown in FIG. 5(b), and thereby, the signal lines 1a and 2a get active.

[Problem to Be Solved by the Invention]

The existing RTP function has a problem that a microcomputer cannot output data in real time when data is requested from the outside of the microcomputer because data output uses RTPOUT generated by the RTP output request signal generating circuit 5 operating synchronously with the clock of the microcomputer.

SUMMARY OF THE INVENTION

[Object]

The present invention is made to solve the above problem and its object is to provide a microcomputer capable of outputting data in real time in accordance with an RTP output request given from the outside of the microcomputer. [Means for Solving the Problem]The microcomputer according to one aspect of the invention of the present invention comprises the central processing unit (CPU 7) for performing operation of digital signals, the read only memory (ROM 8) in which a program for operating the central processing unit is written, the register (RTF data output register 1) for temporarily storing data for operation results, and the gate (transmission gate 4) for outputting the data in accordance with the output request signal (RTPOUT); wherein the external terminal (3) is used and the output request signal is set as a signal for operating the gate through the external terminal (3).

The microcomputer according to another aspect of the invention of the present invention further comprises the output request signal generating means (RTP output request signal generating circuit 5) for outputting an output request signal to the gate under the control of a central processing unit.

The microcomputer according to another aspect of the invention of the present invention further comprises the register 9 and the comparing means (AND circuit 10) for activating the output request generating means when a value previously set to the register coincides with the data sent from the central processing unit.

[Function]

The microcomputer according to another aspect of the invention inputs an external output request signal through an external terminal and outputs data to the outside by operating a gate.

The microcomputer according to another aspect of the invention is able to output data in accordance with output request signals sent from an output request signal generating means and external terminal.

The microcomputer according to another aspect of the invention is able to adjust the data output timing by changing the set value of a register.

The above and other objects, features, and advantages of the invention will become more apparent from the following description when taken in conjunction with the accompanying drawings.

BRIEF DESCRIPTION OF THE DRAWINGS

[Brief Description of the Drawings]

Figure 1:
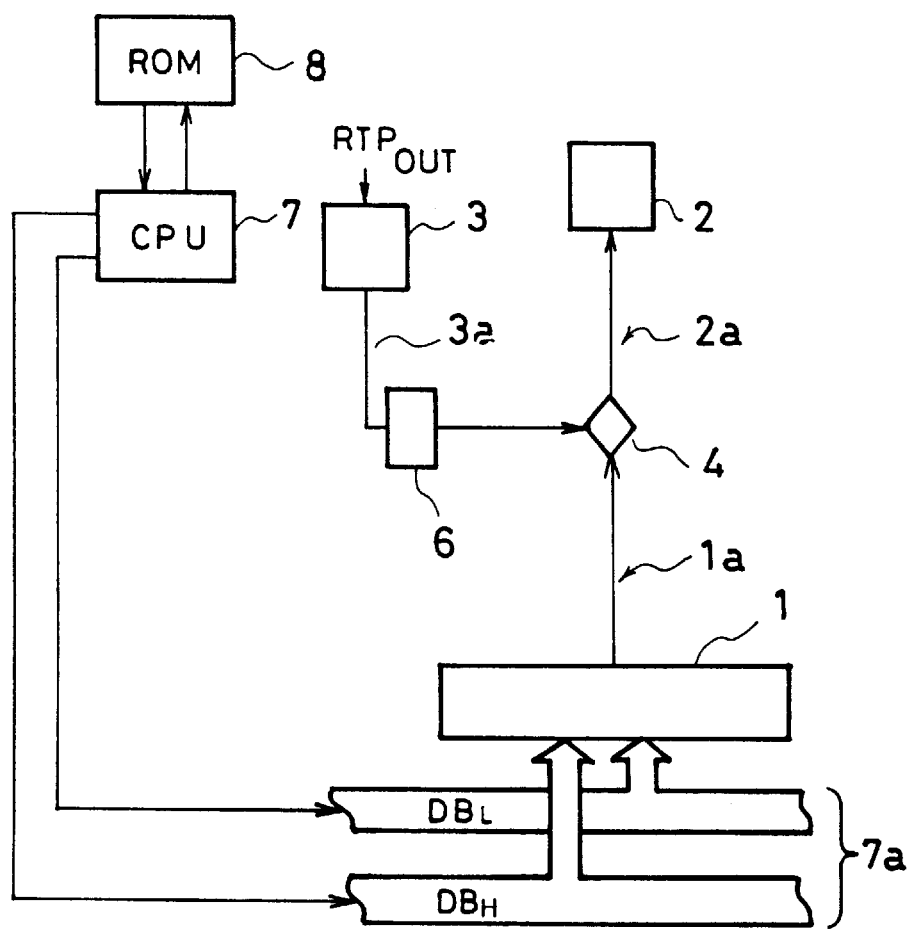
Figure 2:
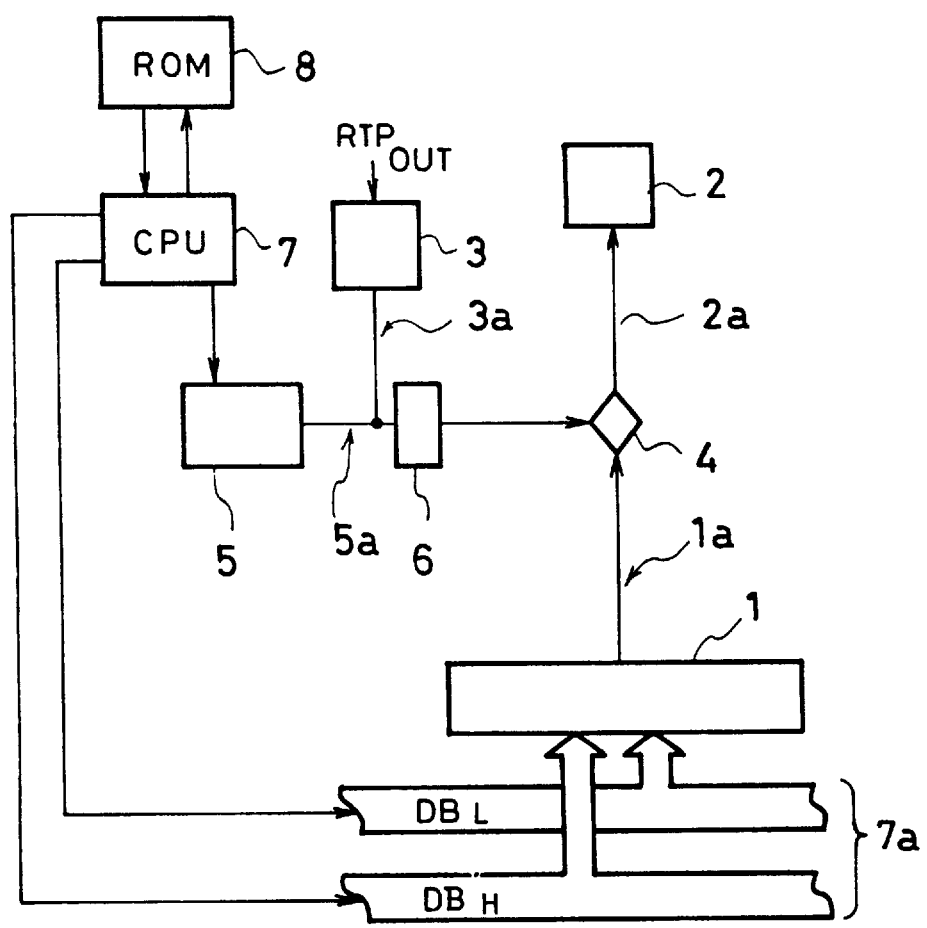
Figure 3:
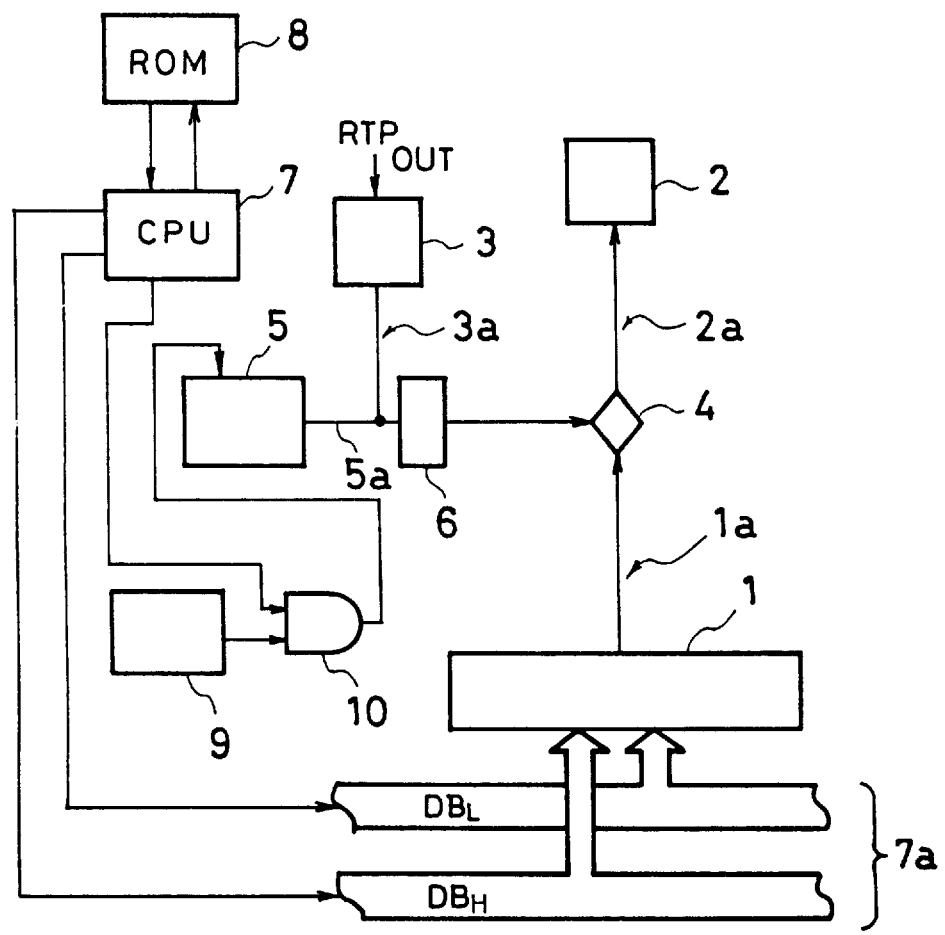
Figure 4:
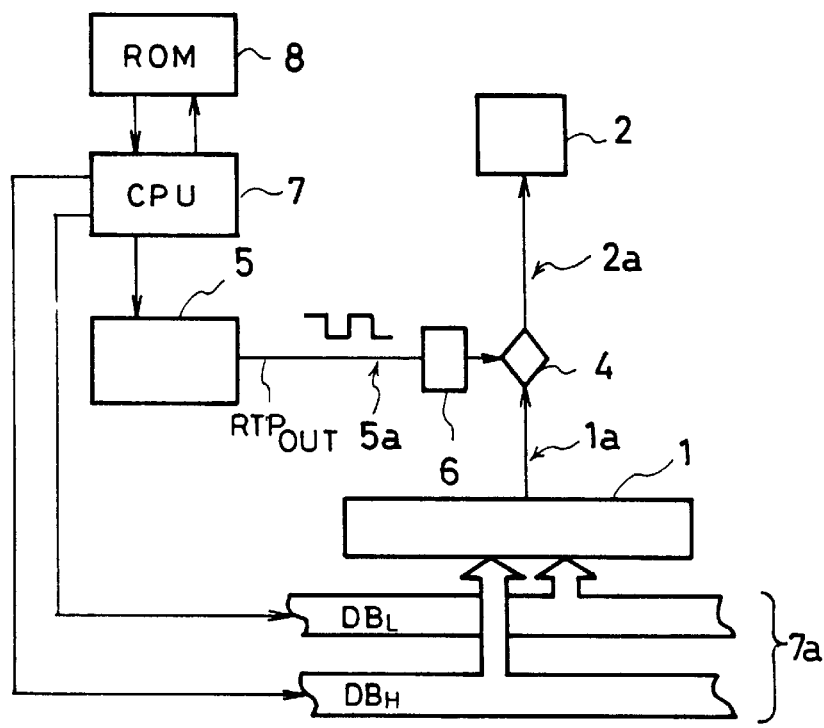
Figure 5A:
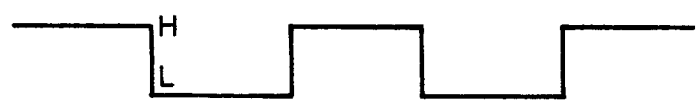
Figure 5B:

FIG. 1 is a block diagram of the RTP function of an embodiment of the present invention;

FIG. 2 is a block diagram of the RTP function of another embodiment of the present invention;

FIG. 3 is a block diagram of the RTP function of still another embodiment of the present invention;

FIG. 4 is a block diagram of the RTP function of an embodiment according the prior art; and FIG. 5(a) shows a waveform of RTP request signal;

FIG. 5(b) shows a waveform output by the waveform shaping circuit.

DESCRIPTION OF THE PREFERRED EMBODIMENTS

[Embodiments]

Embodiment 1.

An embodiment of the present invention is described below by referring to drawings. FIG. 1 is a block diagram showing the RTP function of an embodiment of the microcomputer of the present invention. Components same as those in the existing embodiment in FIG. 4 are provided with the same symbol and their description is omitted. In FIG. 1, numeral 3 is an external terminal to which the external RTP output request signal RTPOUT is inputted. Alphanumeric 3a is a signal line for external RTPOUT.

The following is the detailed description of the RTP function of an embodiment of the present invention using FIG. 1. In FIG. 1, data is stored in the RTP data output register 1 through the data bus 7a similarly to the existing RTP. The stored data is outputted to the external output terminal 2 because RTPOUT given from the outside of the microcomputer is inputted to the transmission gate 4 through the signal line 3a and the signal lines 1a and 2a get active.

This embodiment makes it possible to output data in accordance with an RTP output request given from the outside of the microcomputer in real time. Moreover, because the RTP output request signal generating circuit 5 is unnecessary, the advantage peculiar to this embodiment is also obtained that the number of circuit patterns can be decreased.

Embodiment 2.

As shown in FIG. 2, embodiment 2 includes the structure of embodiment 1 in addition to having the RTP output request signal generating circuit 5 as ever. Embodiment 2 makes it possible to output data under the control of the CPU 7 as ever in addition to the advantage of the embodiment 1.

Embodiment 3.

As shown in FIG. 3, with embodiment 3 it is also possible to use the register 9 whose value can be changed by the CPU 7 and detect the value with the AND circuit 10 serving as a comparing means when the value coincides with the output from the CPU 7 to activate the RTP output request signal generating circuit 5. This embodiment makes it possible to adjust the data output timing in accordance with the set value of the register 9 in addition to the advantages of the embodiments 1 and 2. For the operation in accordance with negative logic, it is possible to use an inverter-NOR circuit as the comparing means.

[Advantage of the Invention]

As described above, the present invention makes it possible to output data in real time in accordance with an output request from the outside of a mm by inputting the output request signal sent from the outside of the microcomputer from an external terminal.

What is claimed is:

1. A microcomputer having a storage register for temporarily storing output data to be supplied to the outside of the microcomputer, a read only memory (ROM), and a central processing unit (CPU) for storing the output data in the storage register based on an instruction stored in the ROM, said microcomputer comprising:

an external input terminal for receiving an RTP output request signal from the outside of said microcomputer; and output gate means for supplying the output data stored in the storage register to the outside of the microcomputer in real time in response to said RTP output request signal which is input from the outside of the microcomputer through the external input terminal.

2. The microcomputer of claim 1 further comprising: waveform shaping means for shaping the waveform of the RTP output request signal and supplying the shaped signal to the output gate means.

3. A microcomputer having a storage register for temporarily storing output data to be supplied to the outside of the microcomputer, read only memory (ROM), and a central processing unit (CPU) for storing the output data in the storage register based on an instruction stored in the ROM, said microcomputer comprising:

an external input terminal for receiving a RTP output request signal from the outside of said microcomputer;

output request signal generating means for generating and supplying a second RTP output request signal based on a clock signal from the CPU; and output gate means for supplying the output data stored in the storage register to the outside of the microcomputer in real time in response to the second RTP output request signal or said first RTP output request signal which is input from the outside of the microcomputer through the external input terminal.

4. The microcomputer of claim 3 further comprising:

waveform shaping means for shaping the waveform of the first RTP output request signal or the second RTP output request signal and supplying the shaped signal to the output gate means.

5. A microcomputer having a storage register for temporarily storing output data to be supplied to the outside of the microcomputer, a read only memory (ROM), and a central processing unit (CPU) for storing the output data in the storage register based on an instruction stored in the ROM, said microcomputer comprising:

an external terminal;

a set value register to which a value for adjusting the output timing of the output data is set by the CPU; gate means for receiving an output value from the CPU and set value stored in the set value register and generating a coincidence output signal when these values coincide with each other;

output request signal generating means for generating and supplying a first RTP output request signal based on the coincidence output signal; and output gate means for supplying the output data stored in the storage register to the outside of the microcomputer in real time in response to the first RTP output request signal or a second RTP output request signal which is input from the outside of the microcomputer through the external terminal.

6. The microcomputer of claim 5 further comprising: waveform shaping means for shaping the waveform of the first RTP output request signal or the second RTP output request signal and supplying the shaped signal to the output gate means.

* * * * *